Patented Apr. 23, 1935

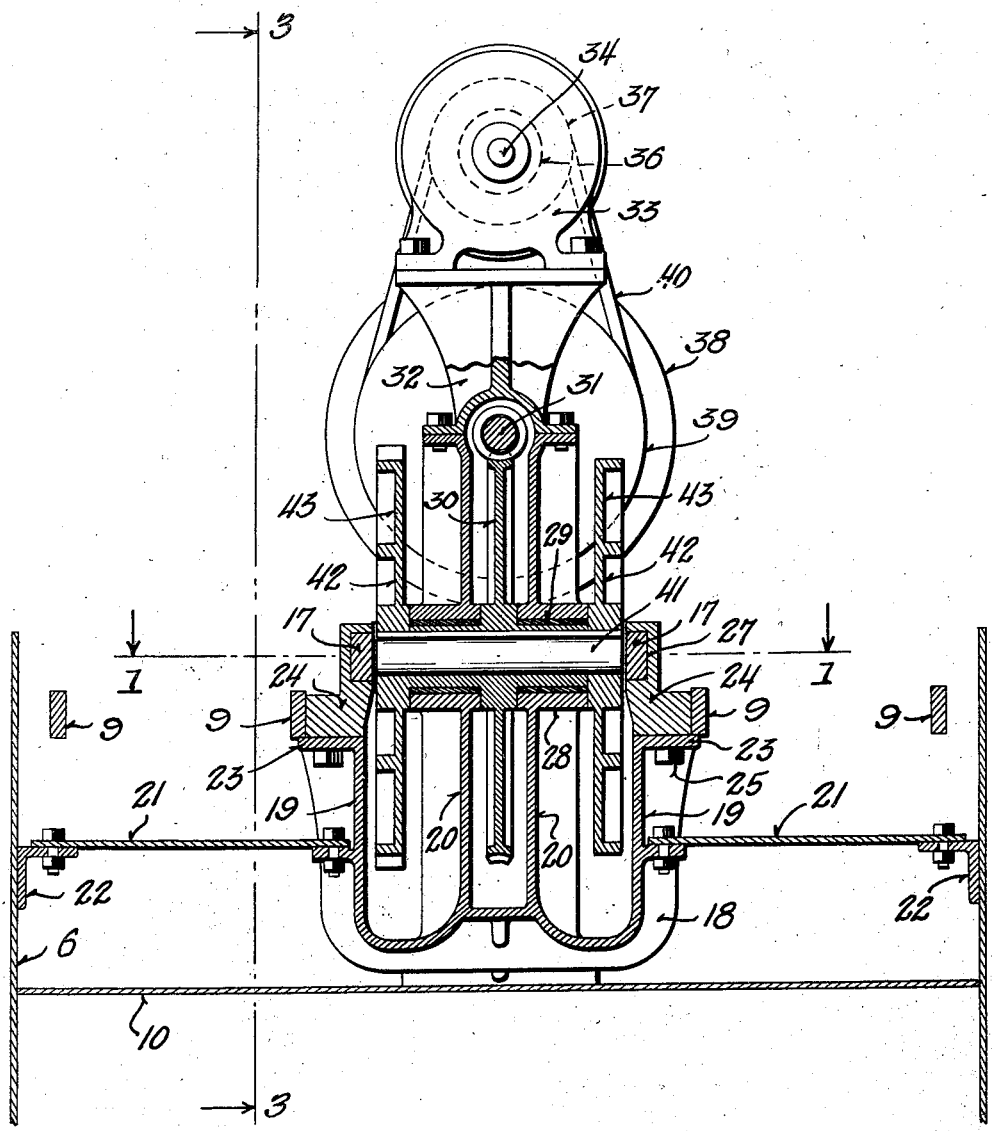

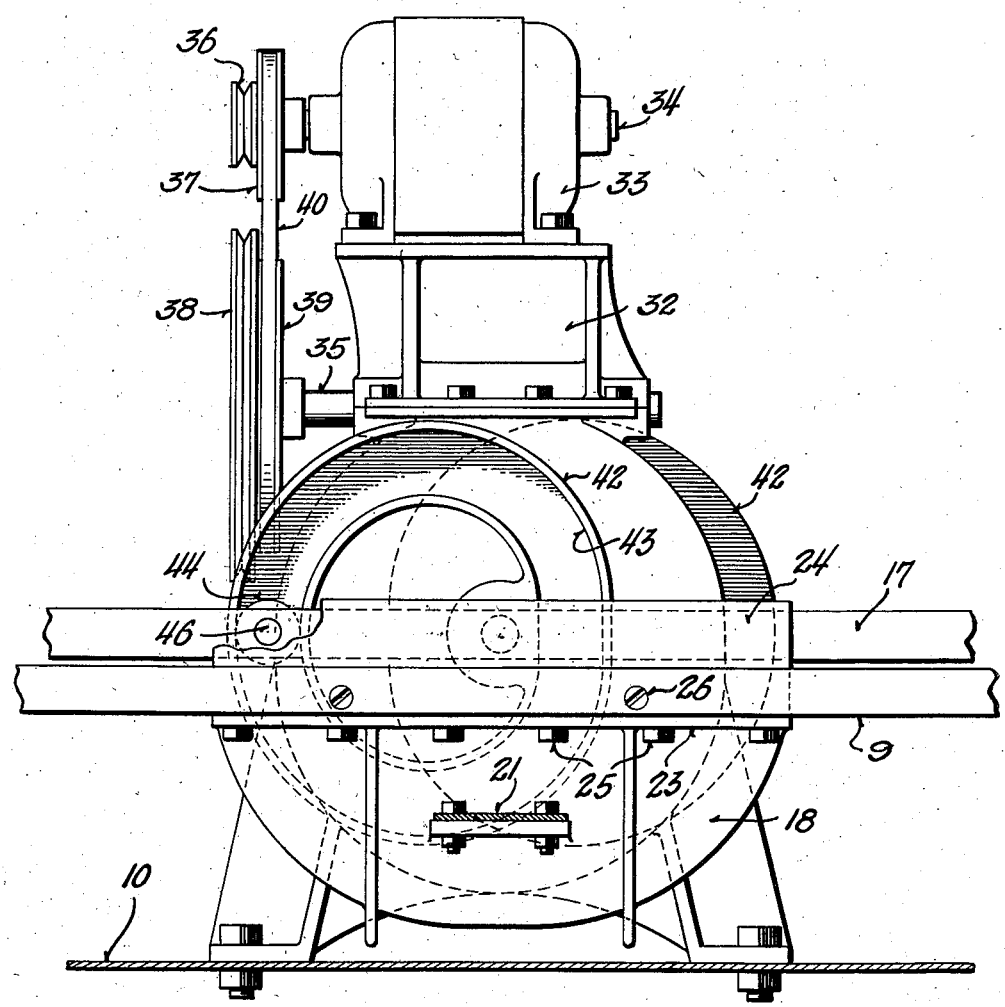
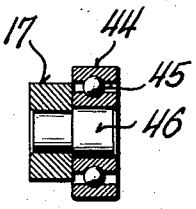

1,998,757

UNITED STATES PATENT OFFICE 1,998,757

BOTTLE CONVEYER DRIVE MECHANISM

Joseph Hauk, Muskego, Wis., assignor to Philip C. Read, Milwaukee, Wis.

Application January 30, 1933, Serial No. 654,177

4 Claims. (Cl. 198—135)

The invention relates to bottle washing machines and more particularly to the conveyer drive mechanism for such machines.

The bottle conveyers of bottle washing machines are usually intermittently driven by mechanism connected with the main drive motor of the machine. With such prior devices power losses occur in the transmission of power from the main motor to the conveyer, and due to wear, lost motion occurs in the parts of the transmission which interferes with the uniform drive to the oppositely disposed feed bars that are operatively connected to the conveyer. Furthermore, where such drive mechanism is used there are many moving parts that need attention and these parts are not readily accessible for adjustment or repair. The object of the present invention is to overcome the difficulties above pointed out by providing a conveyer mechanism which is driven by its own separate and independent motor preferably a small high speed motor which through suitable reduction gearing drives a pair of oppositely disposed cams that actuate the free bars directly to produce a positive and uniform reciprocatory movement of the feed bars which are operatively connected to oppositely disposed runs of the conveyer to intermittently move the same. With the present construction the entire drive mechanism for the conveyer is mounted adjacent the conveyer in a readily accessible position and a great many parts formerly employed have been done away with and a saving in power effected.

The invention further consists in the several features hereinafter set forth and more particularly defined by claims at the conclusion hereof.

In the drawings, Fig. 1 is a horizontal sectional view taken generally on the line 2—2 of Fig. 2, showing the apparatus embodying the invention, parts being broken away;

Fig. 2 is a detail vertical sectional view taken on the line 2—2 of Fig. 2;

Fig. 3 is a detail sectional view taken along the line 3—3 of Fig. 2;

Fig. 4 is a detail sectional view of one of the cam followers.

Figure 1:
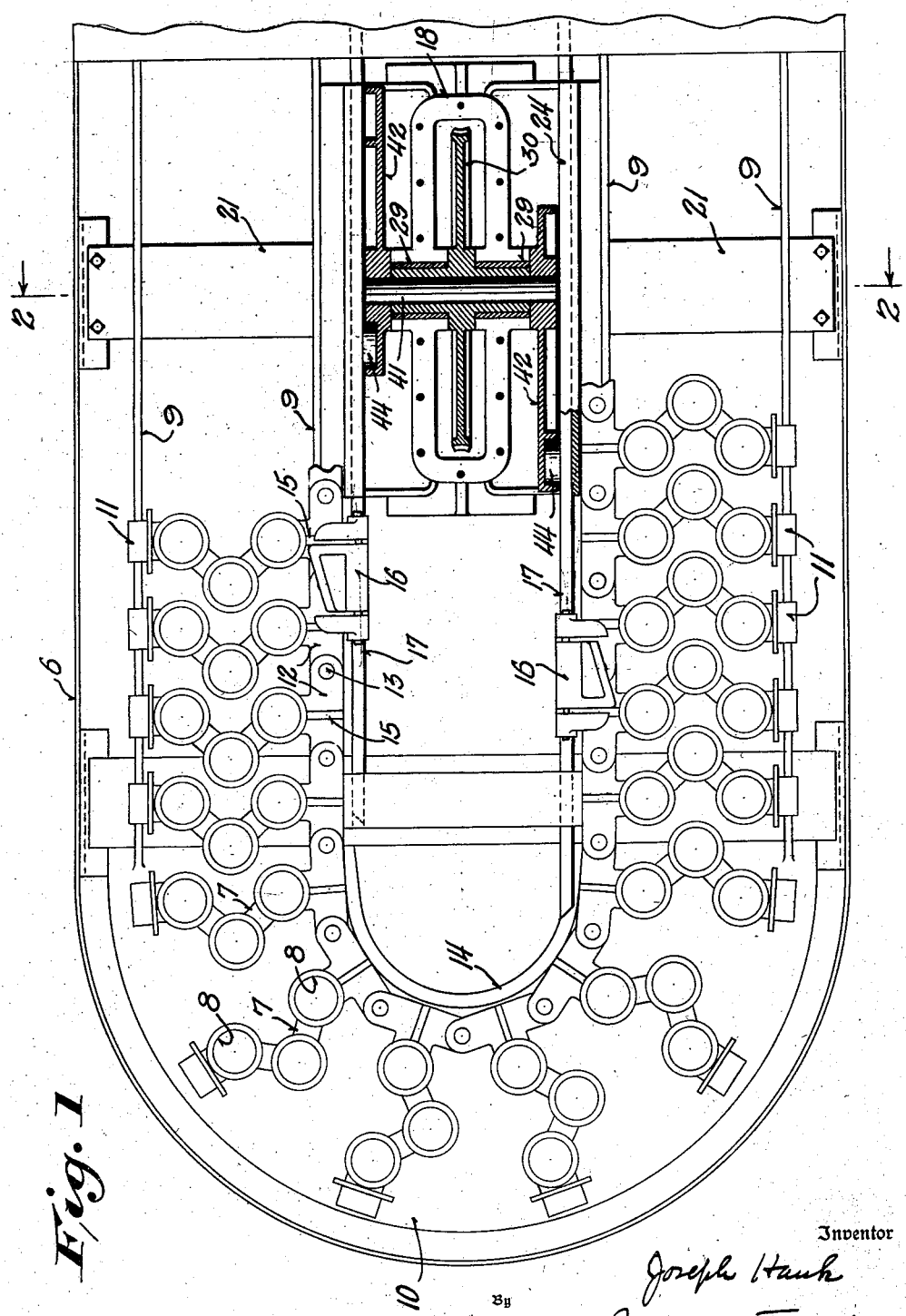

Referring to the drawings, the numeral 6 designates the frame of the machine in which an endless conveyer is mounted, said conveyer including spaced transversely disposed members 7 provided with a plurality of bottle holding pockets 8 to receive the bottles in inverted position. The conveyer members 7 are mounted to move on spaced tracks 9 suitably supported above a bottom plate 10, one end of each member carrying a roller 11 riding on one of the tracks and the other ends 12 connected together by pivot pins 13 to form an endless conveyer. At the ends of the machine where the conveyer turns, the ends 12 are guided about a curved guide member 14. Each member 7 is provided with a lug 15 adapted to be engaged by feed dogs 16 pivotally mounted on and moving with the oppositely disposed feed bars 17. Each dog 16 is of known construction and cooperates with each of the lugs 15 in the manner of a gravity actuated latch to engage behind one of said lugs and feed the conveyer forward on the forward movement of its feed bar 17 and then ride over the next lug and drop behind the same on the rearward movement of the feed bar. Thus by the pawl and ratchet connection thus provided between the conveyer and the feed bars, the conveyer is intermittently advanced on the reciprocatory movement of said feed bars.

According to the present invention the feed bars 17 are positively and uniformly actuated by drive mechanism having its own individual motor drive.

A housing and support 18 is mounted on the bottom plate 10 and includes spaced outer upright portions 19 and spaced inner upright portions 20. The outer portions 19 are shown connected to the side frames of the machine by tie plates 21 bolted to them and to brackets 22 secured to said side frames and said portions are provided with angled portions 23 forming supporting surfaces for feed bar guides 24 secured thereto by bolts 25, the inner tracks 9 also resting on said surfaces and secured to said guides by screws 26. The feed bars 17 are of rectangular section and slidably mounted in similarly shaped recesses 27 in the guide bars 24.

The inner uprights 20 have bearing bosses 28 formed thereon provided with bearing bushings 29 in which the hub portions of a worm wheel 30 are journalled, said worm wheel meshing with a worm 31 journalled in the upper portion of the housing 18 between the section including the parts 20 and a removable top section 32 which also forms the pedestal for an electric motor 33.

The shaft 34 of the motor 33 and the shaft 35 for the worm 31 are connected together by a variable speed drive connection comprising grooved pulleys 36 and 37 on the shaft 34 and grooved pulleys 38 and 39 on the shaft 35 and a belt 40 adapted to connect either the pulleys 36 and 38 together or the pulleys 37 and 39 together, these sets of pulleys being of different diameter to drive the shaft 35 at either high or low speed.

The hub for the worm wheel 30 has a shaft 41 extending therethrough and keyed thereto and provided with extensions on which grooved cams 42 are mounted and to which they are keyed. Each of these cams is provided with a cam groove 43 in which a follower or roller 44 works, said roller having a ball bearing journal portion 45 mounted on a stud shaft 46 secured to one of the feed bars 17. The grooves of the cams 43 have an angular displacement of one hundred and eighty degrees so that as one of the feed bars 17 moves toward the left, the other feed bar on the opposite side is moved toward the right. The cam groove 43 is designed to impart a uniform back and forth or reciprocatory movement to the feed bar and since the cam roller is positively driven thereby and directly connected to the feed bar said bar is positively driven and without any chance for lost motion.

Thus the dogs 16 which intermittently act to move the conveyer forwardly as previously described are positively driven through the feed bars 17 and the cams 42.

It is also to be noted that the entire feed bar drive mechanism is a compact unit mounted adjacent one end of the machine above the bottom plate 10 and readily accessible for inspection or repair and that it comprises only a few moving parts, the roller and cam drive being adapted to render efficient service for a very long time.

I desire it to be understood that this invention is not to be limited to any particular form or arrangement of parts except in so far as such limitations are included in the claims.

What I claim as my invention is:

1. In a bottle washing machine, the combination of an endless conveyer provided with bottle-holding pockets, means for intermittently driving opposite runs of said conveyer comprising a pair of reciprocatory feed bars, a rotary cam for directly and uniformly reciprocating each feed bar during the greater portion of its stroke, a common shaft for said cams, and means for driving said shaft.

2. In a bottle washing machine, the combination of an endless conveyer provided with bottle-holding pockets, means for intermittently driving opposite runs of said conveyer comprising a pair of reciprocatory feed bars and a dog pivotally mounted on each feed bar and having intermittent driving engagement with the conveyer, a roller fixed to each of said feed bars, a grooved cam cooperating with each roller to positively move the same and impart uniform reciprocating movement thereto during the greater portion of its stroke, and means for conjointly rotating said cams.

3. In a bottle washing machine, the combination of an endless conveyer provided with bottle-holding pockets, means for intermittently driving said conveyer including a pair of reciprocatory feed bars, cam means mounted adjacent said bars for positively moving the same, an electric motor distinct from the main drive motor of the machine disposed above said cam means, and reduction mechanism connecting said motor with said cam means to drive the same.

4. In a bottle washing machine, the combination of a motor driven shaft, a pair of grooved cams mounted on said shaft, a support for said shaft including spaced uprights, feed bar guides mounted on said uprights adjacent said cams, feed bars reciprocating in said guides and provided with rollers working in the grooves of said cams, an endless conveyer provided with bottle holding pockets, and means operatively connecting said feed bars with said conveyer to intermittently advance the same.

JOSEPH HAUK.